United States Patent
Liu et al.

(10) Patent No.: US 9,519,845 B2
(45) Date of Patent: Dec. 13, 2016

(54) GRAVITY-ADAPTIVE CARD SEPARATION MECHANISM AND CARD DISTRIBUTION DEVICE WITH THE MECHANISM

(71) Applicant: GRG Huitong Financial Services Co., Ltd., Guangzhou, Guangdong (CN)

(72) Inventors: Junhua Liu, Guandong (CN); Zeyan Guan, Guangdong (CN); Donggui Yu, Guangdong (CN); Qing Liao, Guandong (CN)

(73) Assignee: GRG Huitong Financial Services Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/889,430

(22) PCT Filed: Feb. 13, 2014

(86) PCT No.: PCT/CN2014/072046
§ 371 (c)(1),
(2) Date: Nov. 5, 2015

(87) PCT Pub. No.: WO2015/003494
PCT Pub. Date: Jan. 15, 2015

(65) Prior Publication Data
US 2016/0092756 A1    Mar. 31, 2016

(30) Foreign Application Priority Data
Jul. 11, 2013    (CN) .......................... 2013 1 0291429

(51) Int. Cl.
*B65H 3/66* (2006.01)
*G06K 13/103* (2006.01)
(Continued)

(52) U.S. Cl.
CPC .............. *G06K 13/103* (2013.01); *B65H 3/06* (2013.01); *B65H 3/0684* (2013.01); *B65H 3/34* (2013.01);
(Continued)

(58) Field of Classification Search
None
See application file for complete search history.

(56) References Cited

U.S. PATENT DOCUMENTS

| 3,210,071 A | 10/1965 | Rogers et al. |
| 3,635,465 A | 1/1972 | Beery |

FOREIGN PATENT DOCUMENTS

| CN | 201317601 Y | 9/2009 |
| CN | 201378330 Y | 1/2010 |

(Continued)

OTHER PUBLICATIONS

Extended European Search Report, dated Jul. 5, 2016, from related European Patent Application No. 14822385.2.
(Continued)

*Primary Examiner* — Gene Crawford
*Assistant Examiner* — Ayodeji Ojofeitimi
(74) *Attorney, Agent, or Firm* — Wolf, Greenfield & Sacks, P.C.

(57) ABSTRACT

A gravity-adaptive card separation mechanism, which keeps the friction forces of stacked hard cards basically consistent. The mechanism is arranged on a storage box for storing stacked hard cards, and is used for separating the hard cards individually. The mechanism comprises: a support frame which is used for installing and supporting a floating separation unit and is relatively fixed and assembled with the storage box; and a floating separation unit which is provided with an installation plate, a card milling wheel used for separating cards, a drive motor used for providing a driving (Continued)

force for the card milling wheel, and limiting shafts respectively arranged on the front and rear of the card milling wheel being installed on the mounting plate, wherein the support frame is provided with U-shaped guide groove corresponding to the up and down floating stroke positions of the limiting shafts, the limiting shafts float in the U-shaped guide slots up and down, so that the floating separation unit floats in the support frame up and down, and a position detection unit used for detecting the maximum up and down floating stroke of the floating separation unit is arranged on the support frame.

20 Claims, 3 Drawing Sheets

(51) Int. Cl.
G06K 13/08 (2006.01)
B65H 3/06 (2006.01)
B65H 3/34 (2006.01)
B65H 5/06 (2006.01)

(52) U.S. Cl.
CPC ........ *B65H 3/66* (2013.01); *B65H 5/06* (2013.01); *G06K 13/0806* (2013.01)

(56) References Cited

FOREIGN PATENT DOCUMENTS

| | | |
|---|---|---|
| CN | 101870417 A | 10/2010 |
| CN | 103324960 A | 9/2013 |
| CN | 20355277 U | 4/2014 |
| JP | 2002240975 A | 8/2002 |

OTHER PUBLICATIONS

Chinese Office action, dated Jul. 22, 2015, from corresponding Chinese Application No. 20131029142936.
Search Report, dated Apr. 15, 2014, from corresponding or related International Application No. PCT/CN2014/072046.
Written Opinion, dated Apr. 29 2014, from a corresponding International Application No. PCT/CN2014/072046.

GRAVITY-ADAPTIVE CARD SEPARATION MECHANISM AND CARD DISTRIBUTION DEVICE WITH THE MECHANISM

This application is the national phase of International Application No. PCT/CN2014/072046, entitled "GRAVITY-ADAPTIVE CARD SEPARATION MECHANISM AND CARD DISPENSING DEVICE HAVING THE MECHANISM," filed on Feb. 13, 2014 which claims the benefit of priority to Chinese Patent Application No. CN201310291429.6 titled "GRAVITY-ADAPTIVE CARD SEPARATION MECHANISM AND CARD DISPENSING DEVICE HAVING THE MECHANISM", filed with the Chinese State Intellectual Property Office on Jul. 11, 2013, the entire disclosures of which are incorporated herein by reference.

TECHNICAL FIELD

The present application relates to a sheet-like medium processing technique, and particularly to a gravity-adaptive card separation mechanism, which keeps the frictional forces on stacked hard cards basically consistent, and a card dispensing device.

BACKGROUND

Places such as the subways or the parking lots are crowded with people or vehicles, the flow velocity of people stream or vehicle stream is usually increased by dispensing IC cards (hereinafter abbreviated as hard cards). Since there are a plenty of cards to be sold every day, unattended automatic hard card dispensing devices (hereinafter abbreviated as card dispensing device) are installed at these places to save human resources and improve the transaction efficiency. This card dispensing device should have a high reliability, otherwise, once the card dispensing device fails, congestions may be caused.

The conventional card dispensing device mainly includes two kinds of card separation manners. One kind is mechanical separation manner, which employs reciprocating motions of a scraper to push a card, and a tail end of the card is used as the point of strength to separate the card out of a storage box, however, the surface of the card may be damaged by the reciprocating motions of the scraper. Another kind is a frictional separation manner, which employs a rubber part to rub against the card to separate the card out of the storage box, and in this separation manner, the power of an electrical motor is employed to drag the cards to move upward and downward, to ensure that the cards fit closely with a gravity-adaptive card separation mechanism to separate the cards one by one. However, the control of this manner is limited by the service life of the electrical motor, and it cannot realize the function of using the electric machine to push the cards upward by a distance of the height of one sheet of card once one card is sold, and generally, only after a certain number of cards are sold, the electric machine pushes the remained cards in the storage box upwards by a certain height. For solving the problem that the card separation mechanism cannot come into contact with the cards in the storage box in a certain time, two kinds of solutions are usually adopted in the conventional card dispensing device. The first kind is using the variable diameter of a friction wheel to compensate the difference in height; and the other kind is using the deformation of the friction wheel to compensate the difference in height. The present two kinds of technical solutions may have the following risks that stability of the device may be affected due to external factors such as quality problem of the friction wheel, dust, or low temperature.

In view of the technical issues of the conventional card dispensing device controlled by the electric machine, it is necessary to provide a gravity-adaptive card separation mechanism having a self-resetting function, to improve the reliability of the card dispensing device.

SUMMARY

For solving the problem that the conventional card dispensing device cannot stably separate stacked hard cards one by one, a gravity-adaptive card separation mechanism and a card dispensing device are provided according to the present application, in which an electric motor does not need to lift the stacked hard cards upward each time one card is dispensed.

The gravity-adaptive card separation mechanism is arranged on a storage box for storing stacked hard cards and configured to separate hard cards one by one, and includes a support frame and a floating separation unit. The support frame is configured to mount and support the floating separation unit, and is assembled fixedly with respect to the storage box. The floating separation unit has a mounting plate, and a card rubbing wheel configured to separate the cards, a driving motor configured to provide a driving force for the card rubbing wheel, and position-limiting shafts respectively arranged in front of and at back of the card rubbing wheel are mounted on the mounting plate. U-shaped guide slots are arranged on the support frame at positions corresponding to upward and downward floating strokes of the position-limiting shafts, upward and downward floating of the position-limiting shafts in the U-shaped guide slots is configured to allow the floating separation unit to float upward and downward in the support frame, and the support frame is provided with a position detecting unit configured to detect the maximum strokes of the upward and downward floating of the floating separation unit.

Preferably, two ends of each of the position-limiting shafts are each provided with a stepped portion to prevent axial movement of the position-limiting shaft.

Preferably, the position detecting unit includes a sensor blocking piece fixedly arranged on the floating separation unit, and two sensors fixedly arranged on the support frame at respective positions of the sensor blocking piece corresponding to the maximum strokes of the upward and downward floating of the floating separation unit.

Preferably, a torsional spring is provided between each of the position-limiting shafts and the support frame and is configured to provide a force for the floating separation unit to move the floating separation unit downward.

Preferably, the floating separation unit further includes an upper position-limiting member and a lower position-limiting member both arranged at a front end, in a direction of the cards being sending out, of the card rubbing wheel, and the upper position-limiting member cooperates with the lower position-limiting member to form a card separation gap which is larger than the thickness of one of the hard cards and smaller than the thicknesses of two of the hard cards.

Another object of the present application is to provide a card dispensing device having the gravity-adaptive card separation mechanism, which includes at least one storage box configured to store stacked cards to be dispensed, and the storage box being provided with an opening, a card supporting plate being provided inside the storage box, and the card supporting plate being driven by a control mechanism to push the cards out of the storage box; and the gravity-adaptive card separation mechanism according to any one of the above solutions being superposed on the opening of the storage box.

Further, the card dispensing device includes a card conveying mechanism configured to receive a single card separated by the gravity-adaptive card separation mechanism and deliver the card to a specific position.

Further, the card dispensing device includes a read-write and dispensing mechanism, which butts against the card conveying mechanism and is configured to read and write the card delivered by the card conveying mechanism and then dispense the card to a user.

The present application has the following beneficial effects compared with the conventional technology.

By using the gravity-adaptive card separation mechanism, the card rubbing wheel is always in contact with the card on the top of the cards inside the storage box, and a constant positive pressure is maintained between the card rubbing wheel and the card, thus it is ensured that the card rubbing wheel can rub against the cards inside the storage box, the generated relatively constant frictional force can separate a whole stack of hard cards out of the storage box one by one, thereby effectively solving the problem that single-sheet separation is not smooth due to the inconstant positive pressure between the card rubbing wheel and the cards.

DETAILED DESCRIPTION

For further illustrating the card dispensing device provided by the present application, a preferred embodiment of the present application is described in detail in conjunction with figures.

Figure 1:
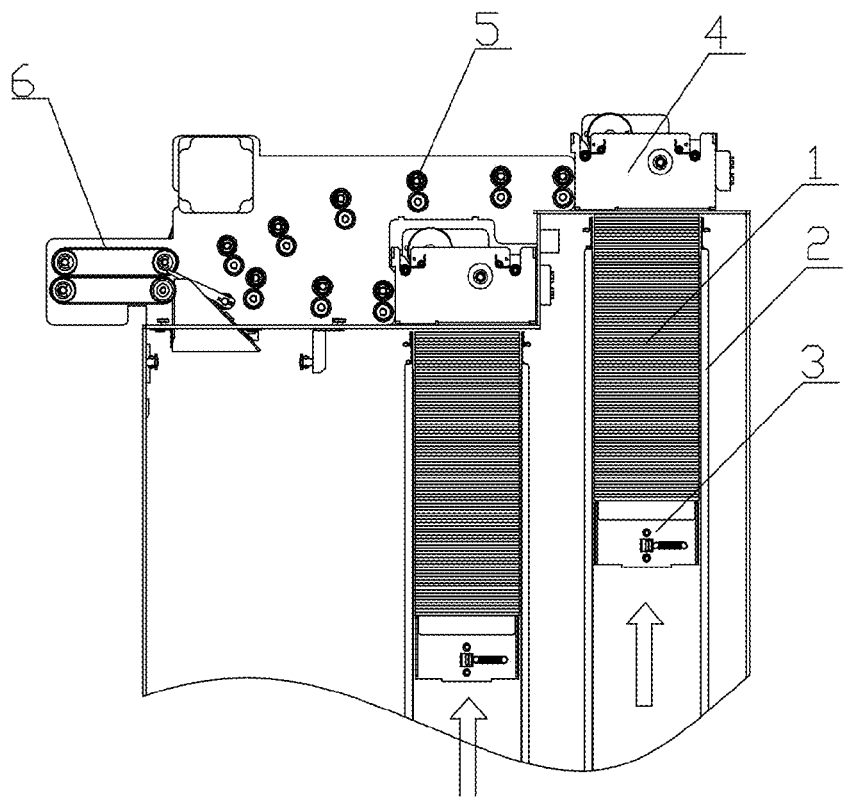
FIG. 1 is a schematic view showing the composition and structure of a preferred embodiment of a card dispensing device provided by the present application.

Reference is made to FIG. 1, which is a schematic view showing the composition and structure of a preferred embodiment of a card dispensing device provided by the present application. The card dispensing device includes a read-write and dispensing mechanism 6 configured to read and write a hard card 1 separated and transferred in a single sheet and then dispense the hard card 1 to a user; a gravity-adaptive card separation mechanism 4 configured to separate stacked hard cards one by one; a card conveying mechanism 5 configured to convey the cards separated out by the gravity-adaptive card separation mechanism 4 to the read-write and dispensing mechanism 6; and at least one storage box 2 configured to store a whole stack of hard cards to be dispensed. The storage box 2 is superposed on the gravity-adaptive card separation mechanism 4, and is provided with an opening. A card supporting plate 3 is provided inside the storage box 2, and the card supporting plate 3 is driven by a control mechanism to push the hard cards into a card-picking preparation position of the gravity-adaptive card separation mechanism 4.

Figure 2:
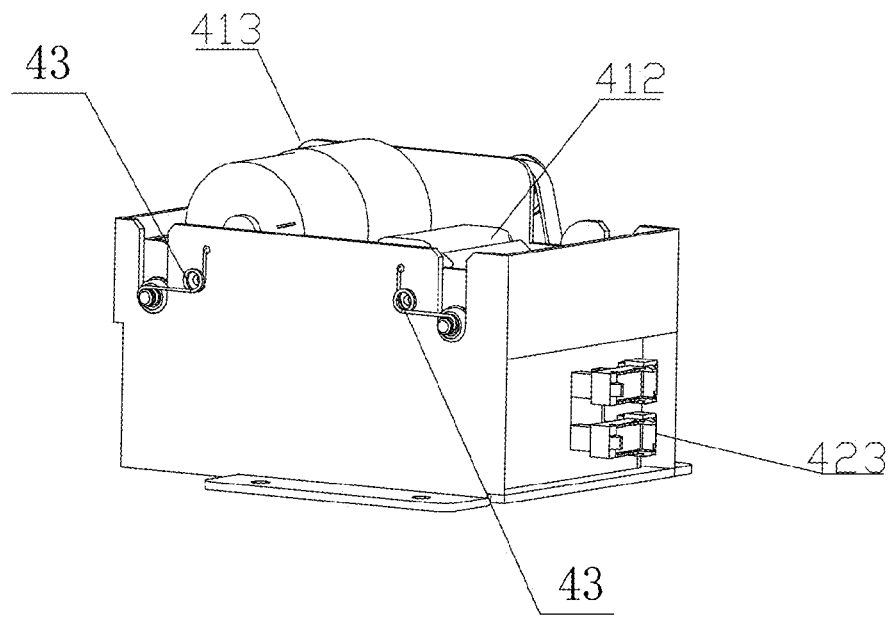
FIG. 2 is a schematic view showing the structure of a gravity-adaptive card separation mechanism in the card dispensing device in FIG. 1.
Figure 3:
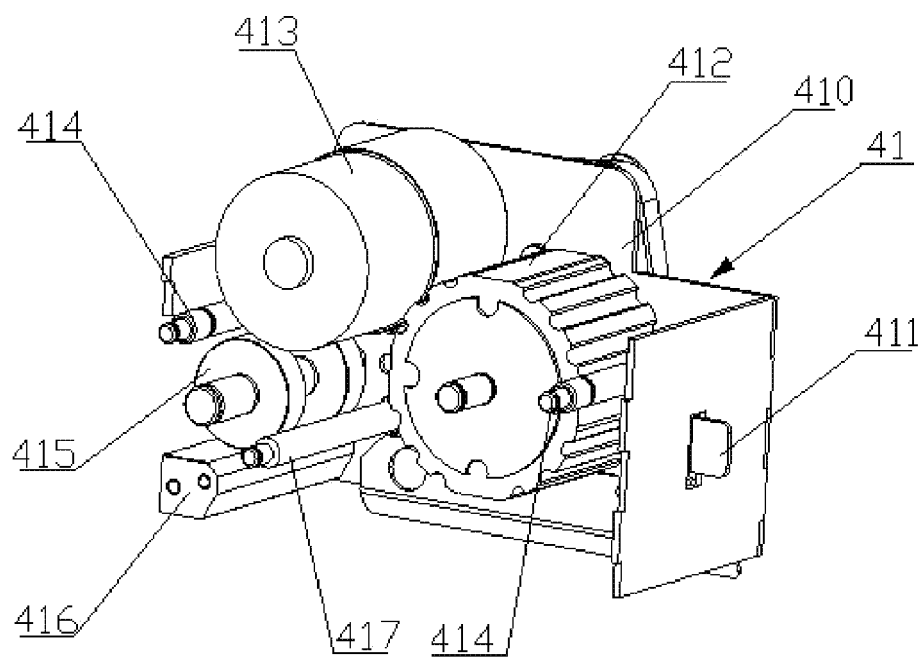
FIG. 3 is a schematic view showing the composition of a floating separation unit in the gravity-adaptive card separation mechanism in FIG. 2.
Figure 4:
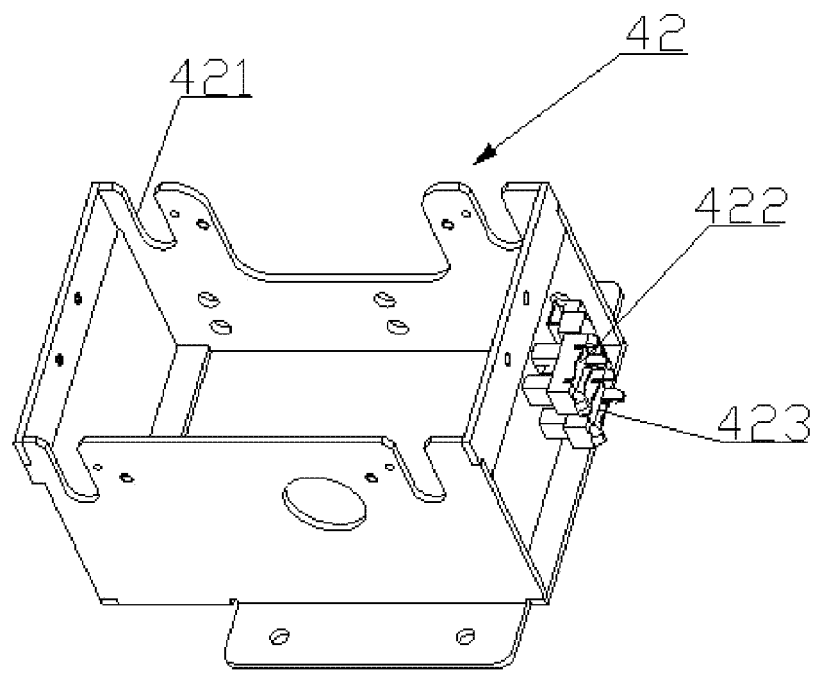
FIG. 4 is a schematic view showing the composition of a support frame in the gravity-adaptive card separation mechanism in FIG. 2.
Figure 5:
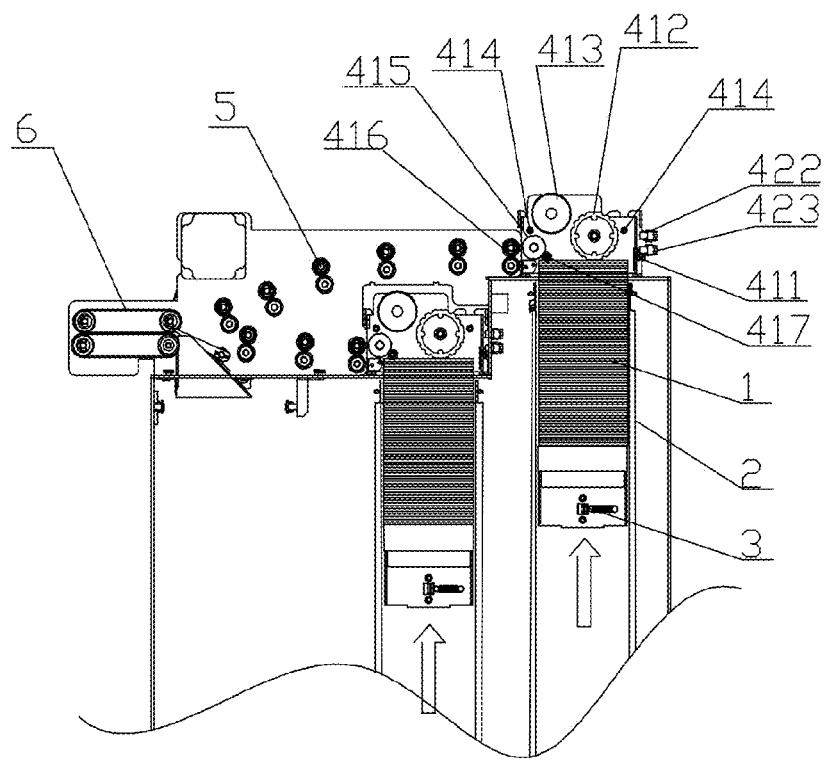
FIG. 5 is a schematic view showing an initial state of the card dispensing device in FIG. 1 when picking cards.
Figure 6:
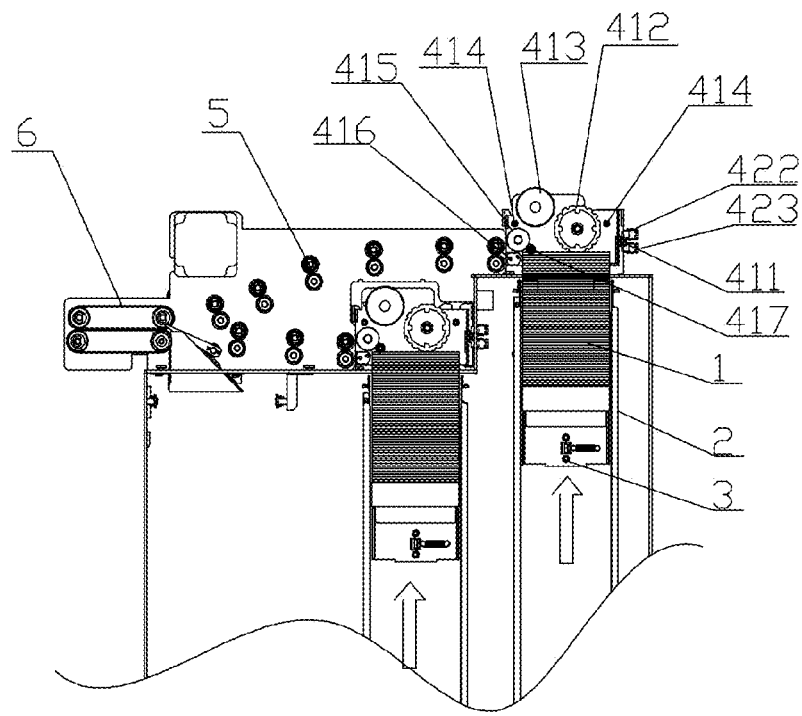
FIG. 6 is a schematic view showing the operating state of the card dispensing device in FIG. 1 when picking cards.

The gravity-adaptive card separation mechanism 4 is arranged on the storage box which stores the stacked hard cards, and is used to separate the hard cards one by one. Referring to FIGS. 2 to 4, the gravity-adaptive card separation mechanism 4 includes a floating separation unit 41 and a support frame 42. The support frame 42 is configured to mount and support the floating separation unit 41, and is fixedly assembled with respect to the storage box 2. The floating separation unit 41 has a mounting plate 410, and a card rubbing wheel 412 configured to separate cards, a driving motor 413 configured to provide a driving force for the card rubbing wheel 412, and position-limiting shafts 414 respectively arranged in front of and at back of the card rubbing wheel 412 are installed on the mounting plate 410.

For ensuring that the floating separation unit 41 can freely float in the support frame 42 to avoid affecting the stability of card separation, two side frames of the support frame 42 are provided with four guide slots 421. The floating separation unit 41 is arranged inside the support frame 42, four ends of the two position-limiting shafts 414 in the floating separation unit 41 are respectively inserted in the four guide slots 421 on the two side frames of the support frame 42. In operating state, the floating separation unit 41 can only move upward and downward along the guide slots 421 of the support frame, and to prevent movements of the position-limiting shaft in the axial direction on the support bracket, a stepped portion configured to prevent the axial movement is provided at both ends of each of the position-limiting shafts.

Further, the support bracket 42 is provided with a position detecting unit configured to detect the maximum strokes of the floating separation unit 41 floating upward and downward. The position detecting unit includes a sensor blocking piece 411 fixedly arranged on the floating separation unit 41, and two sensors 422 and 423 fixedly arranged on the support frame 42 at two respective positions of the sensor blocking piece 411 corresponding to the maximum strokes of the upward and downward floating of the floating separation unit 41.

Further, four torsional springs 43 are arranged between the floating separation unit 41 and the support frame 42. Each of the four torsional springs 43 has one end fixed on an outer frame of the support frame 42, and another end placed in the slot at the end of the respective position-limiting shaft 414 of the floating separation unit 41. The four torsional springs 43 provide forces for the floating separation unit 41 to move the floating separation unit 41 downward, to make the card rubbing wheel 412 in the floating separation unit 41 apply a certain pre-pressure on the separated card, thus, in the normal state, the position-limiting shafts 414 of the floating separation unit 41 can be maintained at bottoms of the guide slots 421 of the support frame 42.

Further, for ensuring that only one card is separated out each time, the floating separation unit 41 is provided with an upper position-limiting member 415 and a lower position-limiting member 416 at a front end, in the direction of cards being delivered out, of the card rubbing wheel 412. The upper position-limiting member 415 cooperates with the lower position-limiting member 416 to form a card separation gap which is larger than the thickness of one card and smaller than the thicknesses of two cards. The upper position-limiting member 415 is fixed on the floating separation unit 41 and the relative position of the upper position-limiting member 415 with respect to the floating separation unit 41 is fixed. The lower position-limiting member 416 is fixed to the floating separation unit 41 via a fastener, and the relative position of the lower position-limiting member 416 with respect to the floating separation unit 41 may be adjusted upward and downward according to requirements, to adapt to hard cards with different thicknesses. Of course, the object can also be realized by configuring the upper position-limiting wheel 415 as a movable and adjustable member.

Of course, for reliably separating the cards one by one, the floating separation unit 41 further includes a position-limiting shaft 417. The position-limiting shaft 417 is located between the upper position-limiting wheel 415 and the card rubbing wheel 412, and is configured to prevent a front end of the hard card from tilting upward.

The operating principle of the card dispensing device is illustrated in conjunction with FIG. 1 to FIG. 6 hereinafter. In an initial state of the card dispensing device, the operating condition sensor 422 and the card preparation sensor 423 at the rear end of the support frame 42 are used to monitor a specific position of the floating separation unit 41. When an upper-layer program detects that the sensor blocking piece 411 of the floating separation unit 41 doesn't block the operating state sensor 422, a control mechanism (not shown in the figures) drives the card supporting plate 3 to lift the hard cards 1 upwards to place the hard cards 1 into a card picking preparation position of the gravity-adaptive card separation mechanism 4, until the sensor blocking piece 411 blocks the operating state sensor 422, and at this time, the card dispensing device is in a state of selling the cards 1, the gravity-adaptive card separation mechanism 4 separates the cards out from the storage box 2 into single sheets one by one, and the single card 1 separated by the gravity-adaptive card separation mechanism 4 is delivered to a card read-write position via the card conveying mechanism 5. The read-write and dispensing mechanism 6 is used to read and write the card 1 delivered by the card conveying mechanism and then dispense the card to a user. After multiple cards 1 are continuously sold, the floating separation unit 41 may descend continually with the decrease of the cards 1 inside the storage box 2, and when the sensor blocking piece 411 of the floating separation unit 41 blocks the card preparation sensor 423, the control mechanism drives the card supporting plate 3 to push the whole stacked hard cards 1 upwards to place the hard cards 1 into the card-picking preparation position of the gravity-adaptive card separation mechanism 4, that is, when the sensor blocking piece 411 blocks the operation sensor 422, the sensor blocking piece 411 of the floating separation unit 4 moves from the position of the operation sensor 422 to the position of the card preparation sensor 423. Due to the own gravity of the floating separation unit 41 and the action of the springs 43, the card rubbing wheel 412 is always in contact with the cards 1 and can provide enough relatively constant frictional forces, thereby ensuring that the cards 1 can be separated out of the storage box 2. The above process repeats again and again until the cards 1 inside the storage box 2 are sold out.

The embodiments described hereinabove are only preferred embodiments of the present application, it should be noted that, the above preferred embodiments should not be interpreted as limitation to the present application, and the scope of the present application should be defined by the claims. For the person skilled in the art, a few of improvements and modifications may be made to the present application without departing from the spirit and scope of the present application, and these improvements and modifications are also deemed to fall into the scope of the present application.

The invention claimed is:

1. A gravity-adaptive card separation mechanism, arranged on a storage box for storing stacked hard cards and configured to separate hard cards one by one, wherein the mechanism comprises:
   a support frame, configured to mount and support a floating separation unit, and being assembled fixedly with respect to the storage box; and
   the floating separation unit, having a mounting plate, wherein a card rubbing wheel configured to separate the cards, a driving motor configured to provide a driving force for the card rubbing wheel, and position-limiting shafts respectively arranged in front of and at back of the card rubbing wheel are mounted on the mounting plate;
   wherein U-shaped guide slots are arranged on the support frame at positions corresponding to upward and downward floating strokes of the position-limiting shafts, upward and downward floating of the position-limiting shafts in the U-shaped guide slots is configured to allow the floating separation unit to float upward and downward in the support frame, and the support frame is provided with a position detecting unit configured to detect the maximum strokes of the upward and downward floating of the floating separation unit.

2. The gravity-adaptive card separation mechanism according to claim 1, wherein two ends of each of the position-limiting shafts are each provided with a stepped portion to prevent axial movement of the position-limiting shaft.

3. The gravity-adaptive card separation mechanism according to claim 1, wherein the position detecting unit comprises a sensor blocking piece fixedly arranged on the floating separation unit, and two sensors fixedly arranged on the support frame at respective positions of the sensor blocking piece corresponding to the maximum strokes of the upward and downward floating of the floating separation unit.

4. The gravity-adaptive card separation mechanism according to claim 1, wherein a torsional spring is provided between each of the position-limiting shafts and the support frame and is configured to provide a force for the floating separation unit to move the floating separation unit downward.

5. The gravity-adaptive card separation mechanism according to claim 1, wherein the floating separation unit further comprises an upper position-limiting member and a lower position-limiting member both arranged at a front end, in a direction of the cards being sent out, of the card rubbing wheel, and the upper position-limiting member cooperates with the lower position-limiting member to form a card separation gap which is larger than the thickness of one of the hard cards and smaller than the thicknesses of two of the hard cards.

6. A card dispensing device, having a gravity-adaptive card separation mechanism, wherein the card dispensing device comprises:
   at least one storage box configured to store stacked cards to be dispensed, and the storage box being provided with an opening, a card supporting plate being provided inside the storage box, and the card supporting plate being driven by a control mechanism to push the cards out of the storage box; and gravity-adaptive card separation mechanism being superposed on the opening of the storage box; wherein
the gravity-adaptive card separation mechanism is configured to separate hard cards one by one, and comprises:
a support frame, configured to mount and support a floating separation unit, and being assembled fixedly with respect to the storage box; and
the floating separation unit, having a mounting plate, wherein a card rubbing wheel configured to separate the cards, a driving motor configured to provide a driving force for the card rubbing wheel, and position-limiting shafts respectively arranged in front of and at back of the card rubbing wheel are mounted on the mounting plate;
wherein U-shaped guide slots are arranged on the support frame at positions corresponding to upward and downward floating strokes of the position-limiting shafts, upward and downward floating of the position-limiting shafts in the U-shaped guide slots is configured to allow the floating separation unit to float upward and downward in the support frame, and the support frame is provided with a position detecting unit configured to detect the maximum strokes of the upward and downward floating of the floating separation unit.

7. The card dispensing device according to claim 6, further comprising a card conveying mechanism configured to receive a single card separated by the gravity-adaptive card separation mechanism and deliver the card to a specific position.

8. The card dispensing device according to claim 7, further comprising a read-write and dispensing mechanism, which butts against the card conveying mechanism and is configured to read and write the card delivered by the card conveying mechanism and then dispense the card to a user.

9. The card dispensing device according to claim 6, wherein two ends of each of the position-limiting shafts are each provided with a stepped portion to prevent axial movement of the position-limiting shaft.

10. The card dispensing device according to claim 6, wherein the position detecting unit comprises a sensor blocking piece fixedly arranged on the floating separation unit, and two sensors fixedly arranged on the support frame at respective positions of the sensor blocking piece corresponding to the maximum strokes of the upward and downward floating of the floating separation unit.

11. The card dispensing device according to claim 6, wherein a torsional spring is provided between each of the position-limiting shafts and the support frame and is configured to provide a force for the floating separation unit to move the floating separation unit downward.

12. The card dispensing device according to claim 6, wherein the floating separation unit further comprises an upper position-limiting member and a lower position-limiting member both arranged at a front end, in a direction of the cards being sent out, of the card rubbing wheel, and the upper position-limiting member cooperates with the lower position-limiting member to form a card separation gap which is larger than the thickness of one of the hard cards and smaller than the thicknesses of two of the hard cards.

13. The card dispensing device according to claim 9, further comprising a card conveying mechanism configured to receive a single card separated by the gravity-adaptive card separation mechanism and deliver the card to a specific position.

14. The card dispensing device according to claim 13, further comprising a read-write and dispensing mechanism, which butts against the card conveying mechanism and is configured to read and write the card delivered by the card conveying mechanism and then dispense the card to a user.

15. The card dispensing device according to claim 10, further comprising a card conveying mechanism configured to receive a single card separated by the gravity-adaptive card separation mechanism and deliver the card to a specific position.

16. The card dispensing device according to claim 15, further comprising a read-write and dispensing mechanism, which butts against the card conveying mechanism and is configured to read and write the card delivered by the card conveying mechanism and then dispense the card to a user.

17. The card dispensing device according to claim 11, further comprising a card conveying mechanism configured to receive a single card separated by the gravity-adaptive card separation mechanism and deliver the card to a specific position.

18. The card dispensing device according to claim 17, further comprising a read-write and dispensing mechanism, which butts against the card conveying mechanism and is configured to read and write the card delivered by the card conveying mechanism and then dispense the card to a user.

19. The card dispensing device according to claim 12, further comprising a card conveying mechanism configured to receive a single card separated by the gravity-adaptive card separation mechanism and deliver the card to a specific position.

20. The card dispensing device according to claim 19, further comprising a read-write and dispensing mechanism, which butts against the card conveying mechanism and is configured to read and write the card delivered by the card conveying mechanism and then dispense the card to a user.

* * * * *